March 6, 1934.    S. P. THACHER    1,949,501
TIRE RIM
Filed May 7, 1931
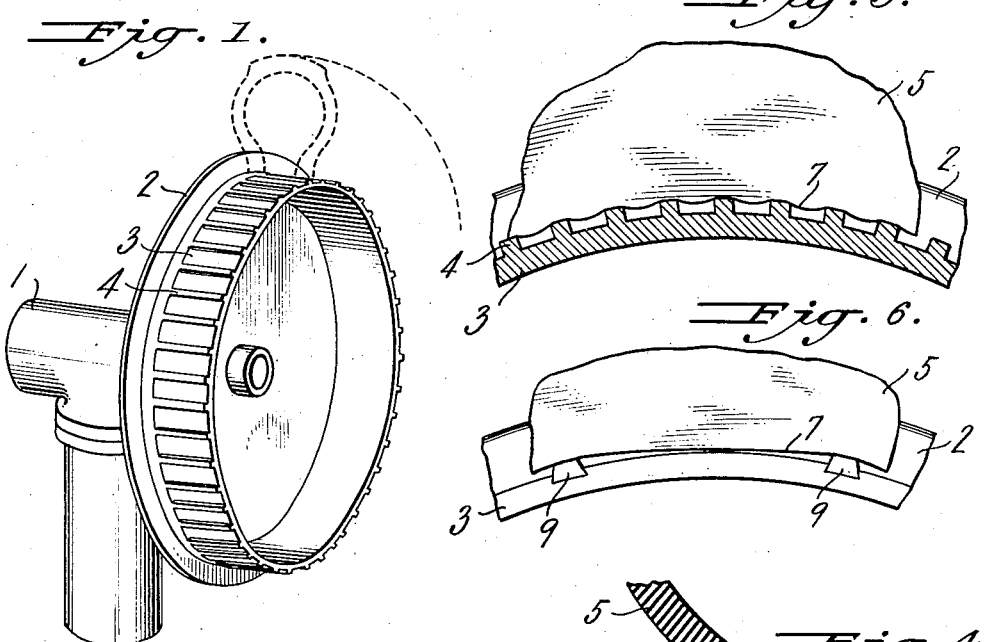
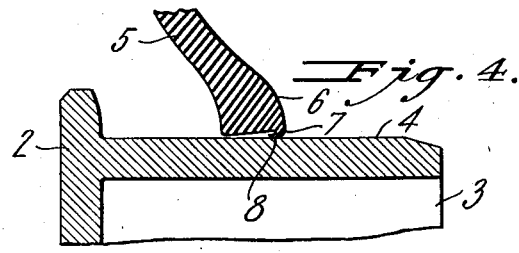
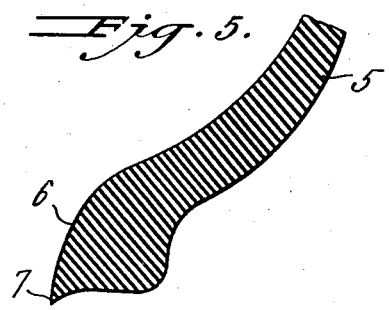
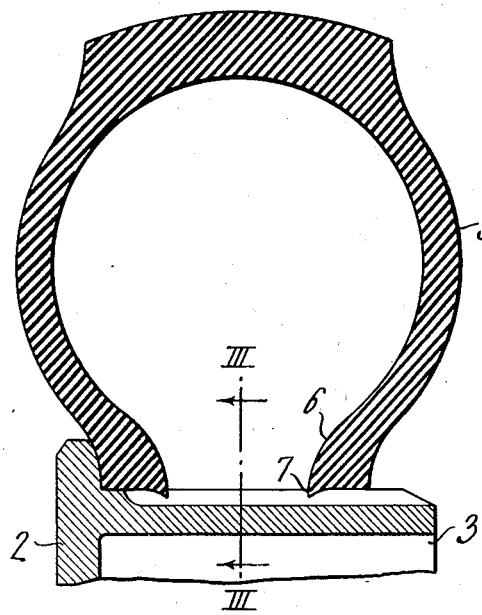
INVENTOR
SHELDON P. THACHER
ATTORNEY Patented Mar. 6, 1934

1,949,501

UNITED STATES PATENT OFFICE 1,949,501

TIRE RIM

Sheldon P. Thacher, Detroit, Mich., assignor to Morgan & Wright, Detroit, Mich., a corporation of Michigan Application May 7, 1931, Serial No. 535,655

4 Claims. (Cl. 73—51)

This invention relates to rims for receiving tires of various kinds, such as aeroplanes, trucks or automobile tires, or other similarly shaped articles.

Prior to my invention, it has been the practice in mounting a tire on a rim to use considerable force in overcoming the friction and binding effect between the beads or other inner peripheral surfaces of the tire and the contacting peripheral surface of the rim, during lateral movement of the tire across the peripheral surface of the rim.

The adoption of the drop center rim by the automobile industry necessitated a change in the beads of the tires to be used with those rims. This change consisted of employing a soft rubber extension at the toes of the tire beads. In mounting and dismounting tires provided with beads having these soft extensions upon the rim of a tire balancing drum, it has been found that the soft toe extension on the bead being pushed, as distinguished from the bead being dragged, curls under the bead from which it projects and thus produces a binding effect which in many cases requires considerable force to overcome. This force becomes of considerable importance and a source of damage if applied to the rim of a tire balancing drum which necessarily employs rather delicate and sensitive mechanism in its construction. Moreover the operators employed in testing tires for their degree of unbalance can work at a uniform steady gait unhampered by the tugging and pulling which was customary before the adoption of my friction reducing rim. By providing the rim of the balancing drum with spaced ribs or raised portions, I have overcome the difficulties arising from the binding effect described. Considerable saving in time and correspondingly greater increase in production is made possible by this improvement. Also, where a tube is balanced with the tire, the liability of pinching the tube is lessened.

Certain present preferred embodiments of my invention are illustrated by way of example in the accompanying drawing in which:—

Figure 1 is a perspective view of a portion of the tire balancing apparatus;

Fig. 2 is a cross-sectional view of a balancing drum rim and of a tire casing mounted thereon;

Fig. 3 is a section taken along line III—III of Fig. 2.

Fig. 4 is a cross sectional view which shows the relation between the tire bead and drum rim which existed prior to the present invention;

Fig. 5 is a fragmentary sectional view of a portion of a tire whose bead is provided with a soft toe extension for use with which my improved rim is particularly desirable; and Fig. 6 is a fragmentary front elevation of the edge of a modified form of rim.

Referring to the drawing, and particularly Figs. 1 to 5, inclusive, I have shown a balancing machine 1. A drum 2 is rotatably mounted on the machine. The drum carries a rim 3 for the reception of a tire 5. The drum and machine may be of the type shown in the application of W. B. Hanford and E. B. Erickson, Serial No. 441,444, filed April 4, 1930, or any other desired type.

In testing tires on a conventional balancing machine, it is the practice to mount the tire 5 on the rim 3 of the drum, and let the tire and drum rotate freely until they come to rest. This brings the heavy side of the tire to the bottom. The tire is then marked with a piece of chalk at the top and if only the location of the light side is desired, the tire is removed. But where the degree of unbalance is also desired, the tire is left on the rim 3 and then rotated through a ninety degree angle which brings the heavy part of the tire to its most unstable position. The drum is then connected to a force measuring device (not shown) and allowed to start rotating back to the most stable position. This causes the force measuring device to show the degree of unbalance, usually in term of inch-ounces. The drum is then disconnected from the force measuring device, the tire pulled off the rim, and the process repeated with another tire.

Heretofore the rims on such machines have been made in the form of a cylinder with a plain outer face over which the tire was slid during its mounting and dismounting.

With the advent of the drop center rim, the tires suitable for use with such rims were provided with beads 6 having soft toe extensions 7, which were adapted to seal or fit against the edges of the rim to provide a smooth engaging surface for the inner tube. However, the application of such tires to the rims heretofore used with balancing machines presented considerable difficulties, owing to the tendency of the soft toe extension 6 being pulled, as distinguished from the one being dragged, to curl between the bead 6 of the tire and the rim as shown at 8 in Fig. 4.

In order to overcome this curling action, I provide the face of the rim with radially projecting portions or raised ribs 4, which not only serve to reduce the frictional area of contact between the tire beads 6 and the rim 3, but also provide recesses which receive the soft toe extensions 7 as shown in Figs. 3 and 6. It has been found that the soft toe extension 7 has sufficient inherent shape retaining properties to prevent the curled effect 8. Thus, the friction is only a very small part of what the friction or binding effect would be when such raised portions or ribs are not provided.

While the ribs are illustrated as extending transversely to the plane of the rim, it is obvious that the same effect and advantages can be obtained by forming them at other angles to said plane.

Fig. 6 illustrates a modified and preferred form of the invention in which the ribs or raised radially projecting portions 9 are in the form of separate bars which are suitably embedded in the rim 3 either by the dovetailed connection shown or in any other desired manner.

It will be noted that while I have shown the ribs in Figs. 1 and 3 as being relatively closely spaced and in Fig. 6 as being widely spaced, it is obvious that one may vary the spacing or number of ribs employed within wide limits, as desired and still obtain the beneficial results flowing from my invention. Also by the use of even a very small number of ribs, for example either four or six, it has been found possible to readily mount and dismount the tires and still have sufficient friction to prevent their moving circumferentially relatively to the rim.

Thus, many modifications and equivalent constructions will suggest themselves to those skilled in the art so that the foregoing specification and accompanying illustrations are given by way of example and are to be construed as illustrative and not as limiting.

Having thus described my invention, what I claim and desire to protect by Letters Patent is:

1. A rigid rim including a substantially cylindrical portion for slidably mounting the beads of a tire casing, a peripheral surface of said rim including radially projecting ribs extending substantially parallel to the axis of the rim.

2. A rigid cylindrical rim for slidably mounting the beads of a tire casing, said rim having one or more radially projecting ribs on a peripheral surface thereof for decreasing axial friction in mounting and dismounting a tire.

3. A rigid cylindrical rim for slidably mounting the beads of a tire casing, said rim having one or more raised ribs on an outer peripheral surface, which rib or ribs extend substantially perpendicularly to an edge of said rim.

4. A tire balancing drum having a rim including a substantially cylindrical portion provided with radially projecting ribs on its outer periphery which ribs extend to one edge of the drum, whereby a tire having beads provided with soft toe extensions may be freely moved axially of the rim, and a flange at the other side of the drum extending radially beyond the outer surfaces of said ribs for engaging an outer bead of a tire mounted in said drum.

SHELDON P. THACHER.